United States Patent
Fujiyama et al.

US 8,083,824 B2

(10) Patent No.: US 8,083,824 B2
(45) Date of Patent: *Dec. 27, 2011

(54) GAS-SOLID SEPARATOR

(75) Inventors: Yuichiro Fujiyama, Yokohama (JP);
Toshiaki Okuhara, Yokohama (JP);
Shigeko Okuhara, legal representative, Fujisawa (JP)

(73) Assignees: Japan Cooperation Center, Petroleum, Tokyo (JP); Nippon Oil Corporation, Tokyo (JP)

(*) Notice: Subject to any disclaimer, the term of this patent is extended or adjusted under 35 U.S.C. 154(b) by 174 days.

This patent is subject to a terminal disclaimer.

(21) Appl. No.: 12/373,136

(22) PCT Filed: Jul. 5, 2007

(86) PCT No.: PCT/JP2007/063467
§ 371 (c)(1),
(2), (4) Date: Jun. 18, 2009

(87) PCT Pub. No.: WO2008/007607
PCT Pub. Date: Jan. 17, 2008

(65) Prior Publication Data
US 2010/0000189 A1   Jan. 7, 2010

(30) Foreign Application Priority Data
Jul. 12, 2006  (JP) ................. 2006-192095

(51) Int. Cl.
*B01D 45/00* (2006.01)
(52) U.S. Cl. ............. 55/440; 55/452; 55/441; 55/442; 55/443; 55/444; 55/498; 55/459.3; 55/447; 55/465; 55/337; 55/427; 55/426; 55/DIG. 30
(58) Field of Classification Search ........... 55/440–444, 55/498, 447–465, 337, DIG. 30, 427, 426; 422/147
See application file for complete search history.

(56) References Cited

U.S. PATENT DOCUMENTS
3,992,172 A    11/1976   Clark
(Continued)

FOREIGN PATENT DOCUMENTS
JP             59590           9/1921
(Continued)

OTHER PUBLICATIONS
Y. Fujiyama, "Development of HS-FCC (High-severity Fluid Catalytic Cracking) Technology," Nisski Review, vol. 42, No. 2, pp. 6-12 (2000).

*Primary Examiner* — Jason M Greene
*Assistant Examiner* — Dung H Bui
(74) *Attorney, Agent, or Firm* — Finnegan, Henderson, Farabow, Garrett & Dunner, LLP

(57) ABSTRACT

A gas-solid separator has: an inner cylinder 10 having a closed lower end 11 and an opened upper end 1, and extending in a vertical direction; and an outer cylinder 2 that coaxially covers the inner cylinder 10 from the outside and has a gas vent port 6 formed on the upper end side and communicating with an exterior, wherein a plurality of axially extending long holes 4 are formed on a side surface on the lower end 11 side of the inner cylinder 10 in a circumferential direction, one of long side edge parts of each of the long holes 4 is provided with a guide blade 5 that protrudes outward and is inclined circumferentially so as to cover the long hole 4, and in a section of the outer cylinder 2 that surrounds the plurality of long holes 4 of the inner cylinder 10, an inner diameter D1 of a lower part is larger than an inner diameter D2 of an upper part.

5 Claims, 11 Drawing Sheets

U.S. PATENT DOCUMENTS

| | | | |
|---|---|---|---|
| 4,322,233 A * | 3/1982 | Sisk | 55/426 |
| 5,487,769 A * | 1/1996 | Hutchinson et al. | 55/442 |
| 5,496,394 A * | 3/1996 | Nied | 95/271 |
| 6,146,597 A | 11/2000 | Nishida et al. | 422/147 |
| 6,376,732 B1 * | 4/2002 | Ngan et al. | 585/800 |
| 6,485,536 B1 * | 11/2002 | Masters | 55/337 |
| 6,613,116 B2 * | 9/2003 | Oh | 55/413 |
| 6,666,338 B1 * | 12/2003 | Henriksson et al. | 209/725 |
| 6,797,026 B2 * | 9/2004 | Sechrist et al. | 55/348 |
| 6,810,557 B2 * | 11/2004 | Hansen et al. | 15/353 |
| 6,857,165 B2 * | 2/2005 | Oh | 15/353 |
| 7,169,201 B2 * | 1/2007 | Oh et al. | 55/343 |
| 7,381,235 B2 * | 6/2008 | Koene et al. | 55/394 |
| 7,594,942 B2 * | 9/2009 | Polderman | 55/321 |
| 7,691,161 B2 * | 4/2010 | Oh et al. | 55/337 |
| 7,708,789 B2 * | 5/2010 | Fester | 55/337 |
| 7,722,693 B2 * | 5/2010 | Yoo et al. | 55/345 |
| 7,731,771 B2 * | 6/2010 | Lee et al. | 55/343 |
| 7,744,668 B2 * | 6/2010 | Oh et al. | 55/343 |
| 7,763,090 B2 * | 7/2010 | Gomiciaga-Pereda et al. | 55/459.1 |
| 7,780,753 B2 * | 8/2010 | Lang | 55/337 |
| 2009/0013658 A1 * | 1/2009 | Borgstrom et al. | 55/447 |

FOREIGN PATENT DOCUMENTS

| | | |
|---|---|---|
| JP | 25-416 | 2/1950 |
| JP | 46-37992 | 11/1971 |
| JP | 48-79583 | 9/1973 |
| JP | 51-115373 | 10/1976 |
| JP | 4-227868 | 8/1992 |
| JP | 10-249121 | 9/1998 |
| JP | 10-249122 | 9/1998 |

* cited by examiner

*Fig.5*
(a)
(b)
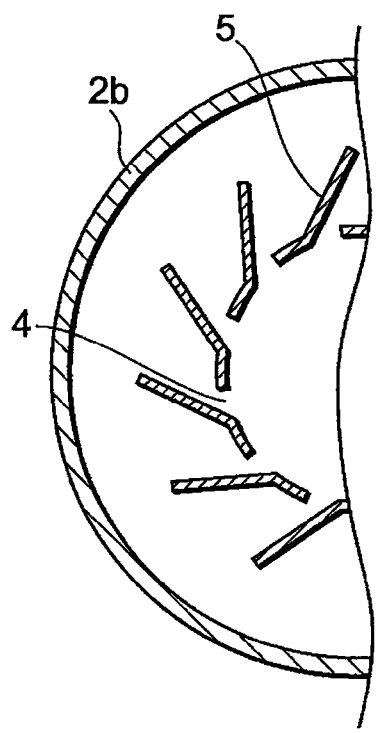
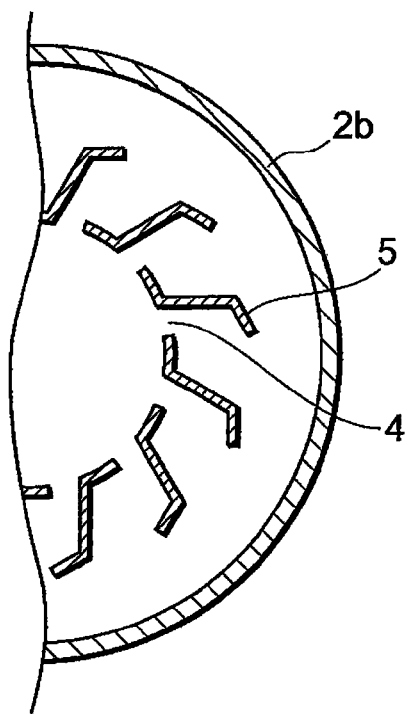

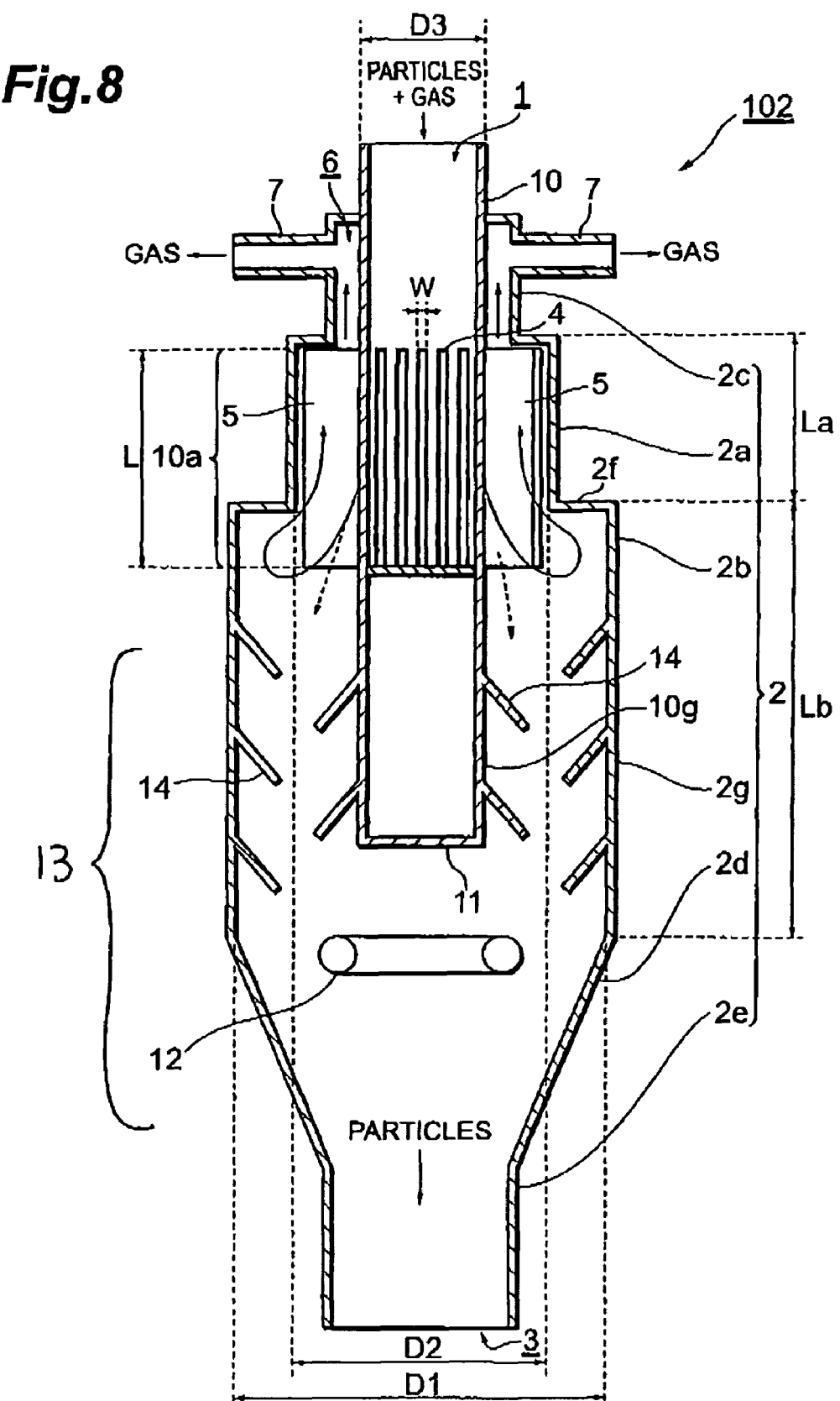

Fig.9

| | | | EXAMPLE 1 | EXAMPLE 2 | EXAMPLE 3 | EXAMPLE 4 | EXAMPLE 5 | EXAMPLE 6 | COMPARATIVE EXAMPLE 1 |
|---|---|---|---|---|---|---|---|---|---|
| SIZE OF SEPARATOR | SHAPE OF GUIDE BLADES | | QUARTER CIRCLE | QUARTER CIRCLE | QUARTER CIRCLE | QUARTER CIRCLE | QUARTER CIRCLE | QUARTER CIRCLE | QUARTER CIRCLE |
| | INNER CYLINDER DIAMETER | mm D3 | 1800 | 1800 | 1800 | 1800 | 1800 | 1800 | 1800 |
| | UPPER OUTER CYLINDER DIAMETER | mm D2 | 3450 | 3450 | 3450 | 3450 | 3450 | 3450 | 3450 |
| | UPPER OUTER CYLINDER LENGTH | mm La | 1120 | 1120 | 1120 | 1120 | 1120 | 1120 | 1120 |
| | LOWER OUTER CYLINDER DIAMETER | mm D1 | 3800 | 3470 | 3485 | 4140 | 4485 | 5175 | 3450 |
| | D1/D2 | - | 1.1 | 1.005 | 1.01 | 1.2 | 1.3 | 1.5 | 1 |
| | POCKET HEIGHT | mm Lc | 330 | 330 | 330 | 330 | 330 | 330 | 330 |
| | PARTICLE VENT TUBE DIAMETER | mm | 2400 | 2400 | 2400 | 2400 | 2400 | 2400 | 2400 |
| | LONG HOLE VERTICAL LENGTH | mm L | 1100 | 1100 | 1100 | 1100 | 1100 | 1100 | 1100 |
| | LONG HOLE WIDTH | mm W | 200 | 200 | 200 | 200 | 200 | 200 | 200 |
| | GUIDE BLADE PROTRUDING LENGTH | mm P | 817 | 817 | 817 | 817 | 817 | 817 | 817 |
| | CONICAL CYLINDER CONE ANGLE | ° | 70 | 70 | 70 | 70 | 70 | 70 | 70 |
| GAS SUPPLY AMOUNT | | m³/h | 111362 | 111362 | 111362 | 111362 | 111362 | 111362 | 111362 |
| CATALYST SUPPLY AMOUNT | | kg/min | 72875 | 72875 | 72875 | 72875 | 72875 | 72875 | 72875 |
| LONG HOLE PASSING GAS LINEAR VELOCITY | | m/s | 11.7 | 11.7 | 11.7 | 11.7 | 11.7 | 11.7 | 11.7 |
| OUTER CYLINDER RISING GAS LINEAR VELOCITY | | m/s | 4.7 | 4.7 | 4.7 | 4.7 | 4.7 | 4.7 | 4.7 |
| CATALYST COLLECTION EFFICIENCY | | % | 88.0 | 76.5 | 77.0 | 88.0 | 87.5 | 87.5 | 65.0 |

Fig.10

| | | | EXAMPLE 1 | EXAMPLE 7 | EXAMPLE 8 | EXAMPLE 9 | EXAMPLE 10 | EXAMPLE 11 |
|---|---|---|---|---|---|---|---|---|
| SIZE OF SEPARATOR | SHAPE OF GUIDE BLADES | | QUARTER CIRCLE | QUARTER CIRCLE | QUARTER CIRCLE | QUARTER CIRCLE | QUARTER CIRCLE | QUARTER CIRCLE |
| | INNER CYLINDER DIAMETER | mm D3 | 1800 | 1800 | 1800 | 1800 | 1800 | 1800 |
| | UPPER OUTER CYLINDER DIAMETER | mm D2 | 3450 | 3450 | 3450 | 3450 | 3450 | 3450 |
| | UPPER OUTER CYLINDER LENGTH | mm La | 1450 | 1450 | 1450 | 1450 | 1450 | 1450 |
| | LOWER OUTER CYLINDER DIAMETER | mm D1 | 3800 | 3800 | 3800 | 3800 | 3800 | 3800 |
| | POCKET HEIGHT | mm Lc | 330 | 330 | 330 | 330 | 330 | 330 |
| | PARTICLE VENT TUBE DIAMETER | mm | 2400 | 2400 | 2400 | 2400 | 2400 | 2400 |
| | LONG HOLE VERTICAL LENGTH | mm L | 1100 | 1100 | 1100 | 1100 | 1100 | 1100 |
| | LONG HOLE WIDTH | mm W | 200 | 200 | 200 | 200 | 200 | 200 |
| | GUIDE BLADE PROTRUDING LENGTH | mm P | 817 | 83 | 165 | 495 | 660 | 825 |
| | P/(D2-D3) | — | 0.495 | 0.05 | 0.1 | 0.3 | 0.4 | 0.5 |
| | CONICAL CYLINDER CONE ANGLE | ° | 70 | 70 | 70 | 70 | 70 | 70 |
| GAS SUPPLY AMOUNT | | m³/h | 111362 | 111362 | 111362 | 111362 | 111362 | 111362 |
| CATALYST SUPPLY AMOUNT | | kg/min | 72875 | 72875 | 72875 | 72875 | 72875 | 72875 |
| LONG HOLE PASSING GAS LINEAR VELOCITY | | m/s | 11.7 | 11.7 | 11.7 | 11.7 | 11.7 | 11.7 |
| OUTER CYLINDER RISING GAS LINEAR VELOCITY | | m/s | 4.7 | 4.7 | 4.7 | 4.7 | 4.7 | 4.7 |
| CATALYST COLLECTION EFFICIENCY | | % | 88.0 | 30.0 | 38.0 | 60.0 | 67.0 | 88.5 |

Fig.11

| | | EXAMPLE 1 | EXAMPLE 12 | EXAMPLE 13 | EXAMPLE 14 | EXAMPLE 15 | EXAMPLE 16 |
|---|---|---|---|---|---|---|---|
| SHAPE OF GUIDE BLADES | | QUARTER CIRCLE | QUARTER CIRCLE | QUARTER CIRCLE | QUARTER CIRCLE | QUARTER CIRCLE | QUARTER CIRCLE |
| INNER CYLINDER DIAMETER mm | D3 | 1800 | 1800 | 1800 | 1800 | 1800 | 1800 |
| UPPER OUTER CYLINDER DIAMETER mm | D2 | 3450 | 3450 | 3450 | 3450 | 3450 | 3450 |
| UPPER OUTER CYLINDER LENGTH mm | La | 1450 | 1450 | 1450 | 1450 | 1450 | 1450 |
| LOWER OUTER CYLINDER DIAMETER mm | D1 | 3850 | 3850 | 3850 | 3850 | 3850 | 3850 |
| POCKET HEIGHT mm | Lc | 330 | 55 | 110 | 440 | 545 | 550 |
| Lc/L | | 0.3 | 0.05 | 0.1 | 0.4 | 0.495 | 0.5 |
| PARTICLE VENT TUBE DIAMETER mm | | 2400 | 2400 | 2400 | 2400 | 2400 | 2400 |
| LONG HOLE VERTICAL LENGTH mm | L | 1100 | 1100 | 1100 | 1100 | 1100 | 1100 |
| LONG HOLE WIDTH mm | W | 200 | 200 | 200 | 200 | 200 | 200 |
| GUIDE BLADE PROTRUDING LENGTH mm | P | 817 | 817 | 817 | 817 | 817 | 817 |
| CONICAL CYLINDER CONE ANGLE ° | | 70 | 70 | 70 | 70 | 70 | 70 |
| GAS SUPPLY AMOUNT m³/h | | 111362 | 111362 | 111362 | 111362 | 111362 | 111362 |
| CATALYST SUPPLY AMOUNT kg/min | | 72875 | 72875 | 72875 | 72875 | 72875 | 72875 |
| LONG HOLE PASSING GAS LINEAR VELOCITY m/s | | 11.7 | 11.7 | 11.7 | 11.7 | 11.7 | 11.7 |
| OUTER CYLINDER RISING GAS LINEAR VELOCITY m/s | | 4.7 | 4.7 | 4.7 | 4.7 | 4.7 | 4.7 |
| CATALYST COLLECTION EFFICIENCY % | | 88.0 | 75.0 | 87.0 | 89.0 | 88.0 | 82.0 |

SIZE OF SEPARATOR

GAS-SOLID SEPARATOR

CROSS-REFERENCE TO RELATED APPLICATIONS

This application is a national phase application of International Application No. PCT/JP2007/063467, filed Jul. 5, 2007, and claims the priority of Japanese Application No. 2006-192095, filed Jul. 12, 2006, the contents of both of which are incorporated herein by reference.

TECHNICAL FIELD

The present invention relates to a gas-solid separator for separating a mixture of solid particles and gas, into solid particles and gas.

BACKGROUND ART

A reaction system in which a particulate solid matter used as a catalyst or a heat medium is brought into contact with a reactant has conventionally been known. Some of the fluidized bed reactors functioning as this reaction system use a dense fluidized bed (bubble fluidized bed) or a high-speed moving bed (high-speed fluidized bed). The high-speed moving bed is used in a reaction that needs to reduce the time during which the solid particles are in contact with the gas (short contact time reaction). Nowadays, an upflow type high-speed moving bed reactor called "riser" has prevailed in fluid catalytic cracking units for producing gasoline using heavy oil or the like as stock oil. This is because the contact time was reduced as the catalytic performance improved, which enhanced the selectivity of the products including gasoline and prevented the occurrence of an unnecessary excessive decomposition reaction.

Also, recently a downflow-type fluidized high-speed moving bed reactor has been proposed. The downflow reactor is preferred because it can achieve a uniform gas-solid flow and has short reaction time.

In the high-speed moving bed reactor, a mixture of a product gas and a particulate solid catalyst flows out of a reactor exit, and how the particulate solid catalyst can be separated promptly from the mixture is the critical issue of this type of device requiring a short contact time reaction. Therefore, the performance of the separator is very important.

The ones described in, for example, Patent Literatures 1 to 3 are known as the above gas-solid separator.

Patent Literature 1: Japanese Patent Application Publication No. H10-249122
Patent Literature 2: U.S. Pat. No. 6,146,597
Patent Literature 3: Japanese Patent Application Publication No. H10-249121

DISCLOSURE OF THE INVENTION

Problem to be Solved by The Invention

However, it turned out that the conventional gas-solid separator lacks in separation efficiency. The present invention was therefore contrived in view of the above problems, and an object thereof is to provide a gas-solid separator that has even higher efficiency of separating gas and a solid matter than the conventional gas-solid separator.

Means for Solving the Problem

A gas-solid separator according to the present invention has: an inner cylinder having a closed lower end and an opened upper end and extending in a vertical direction; and an outer cylinder that coaxially covers the inner cylinder from the outside and has a gas vent port formed on the upper end side and communicating with an exterior, wherein a plurality of axially extending long holes are formed on a side surface on the lower end side of the inner cylinder in a circumferential direction, one of long side edge parts of each of the long holes is provided with a guide blade that protrudes outward and is inclined circumferentially so as to cover the long hole. In a section of the outer cylinder that surrounds the plurality of long holes of the inner cylinder, the inner diameter $D_1$ of a lower part of the outer cylinder is larger than the inner diameter $D_2$ of an upper part of the outer cylinder.

According to the present invention, a mixture of solid particles and gas is supplied downward from an opening of the inner cylinder and then discharged downward from each long hole of the inner cylinder into the outer cylinder. The discharged gas slightly swirls along inner surfaces of the guide blades, and further proceeds downward. Here, some of the solid particles within the mixture collide with the inner surfaces of the guide blades and directly fall downward along the inner surfaces of the guide blades. The direction of the gas including the rest of the solid particles is inverted to an upward direction due to the gas vent port provided in an upper part of the outer cylinder. The gas consequently flows upward along an outer surface of the guide blade provided to the edge part of the adjacent long hole and is thereafter discharged from the gas vent port. When the downward direction of the gas flow is inverted to the upward direction, the solid particles accompanied with the gas are separated from the gas due to their inertia or deadweight and descend mainly along an inner wall while being swirled downward.

Particularly, according to the present invention, in the section of the outer cylinder that surrounds the plurality of long holes of the inner cylinder, the inner diameter $D_1$ of the lower part of the outer cylinder is larger than the inner diameter $D_2$ of the upper part of the outer cylinder. For this reason, it is possible to prevent the ascent velocity of the gas from slowing down when the inverted flow of gas rises, and the gas from rising along with the solid particles. Therefore, the separation efficiency can be improved significantly.

Here, it is preferred that $1.01 \leq (D_1/D_2) \leq 1.3$ be satisfied, in view of efficiently preventing the gas from flowing along with the solid particles when the flow of gas is inverted. When $D_1/D_2$ is 1.01 or lower it is difficult to obtain the effect, but when it exceeds 1.3 the gas residence time increases, which is not preferred when attempting short reaction time in a process.

Moreover, radial direction protruding length P of each guide blade preferably satisfies $(D_2-D_3) \times 0.1 \leq P \leq (D_2-D_3) \times 0.5$, where $D_3$ represents the outer diameter of the inner cylinder. In this way, an inverted flow can be formed efficiently. Values below this lower limit might make it difficult to achieve the inverted flow.

In addition, it is preferred that the outer cylinder be formed by vertically connecting an upper outer cylinder having the inner diameter $D_2$ with a lower outer cylinder having the inner diameter $D_1$ and that the lower outer cylinder surround 5 to 50% of the vertical length L of each long hole from the bottom. If the length of the lower outer cylinder surrounding the long hole is excessively short, the effect of preventing the inverted gas from flowing along with the solid particles becomes low. However, if this length is excessively long, the gas residence time increases, which is not preferred when attempting short reaction time in a process.

EFFECTS OF THE INVENTION

The present invention provides a gas-solid separator that has even higher efficiency of separating gas and a solid matter than to the conventional [gas-solid separator].

BRIEF DESCRIPTION OF THE DRAWINGS

FIG. 5 is a cross-sectional view showing a modification of the guide blades shown in FIG. 3, wherein (a) shows flat guide blades and (b) bent [guide blades];

FIG. 8 is a longitudinal cross-sectional view of a gas-solid separator according to a second embodiment;

FIG. 9 is a table showing the conditions and results obtained in Examples 1 to 6 and Comparative Example 1;

FIG. 10 is a table showing the conditions and results obtained in Examples 7 to 11; and FIG. 11 is a table showing the conditions and results obtained in Examples 12 to 16.

EXPLANATION OF REFERENCE NUMERALS

Figure 1:
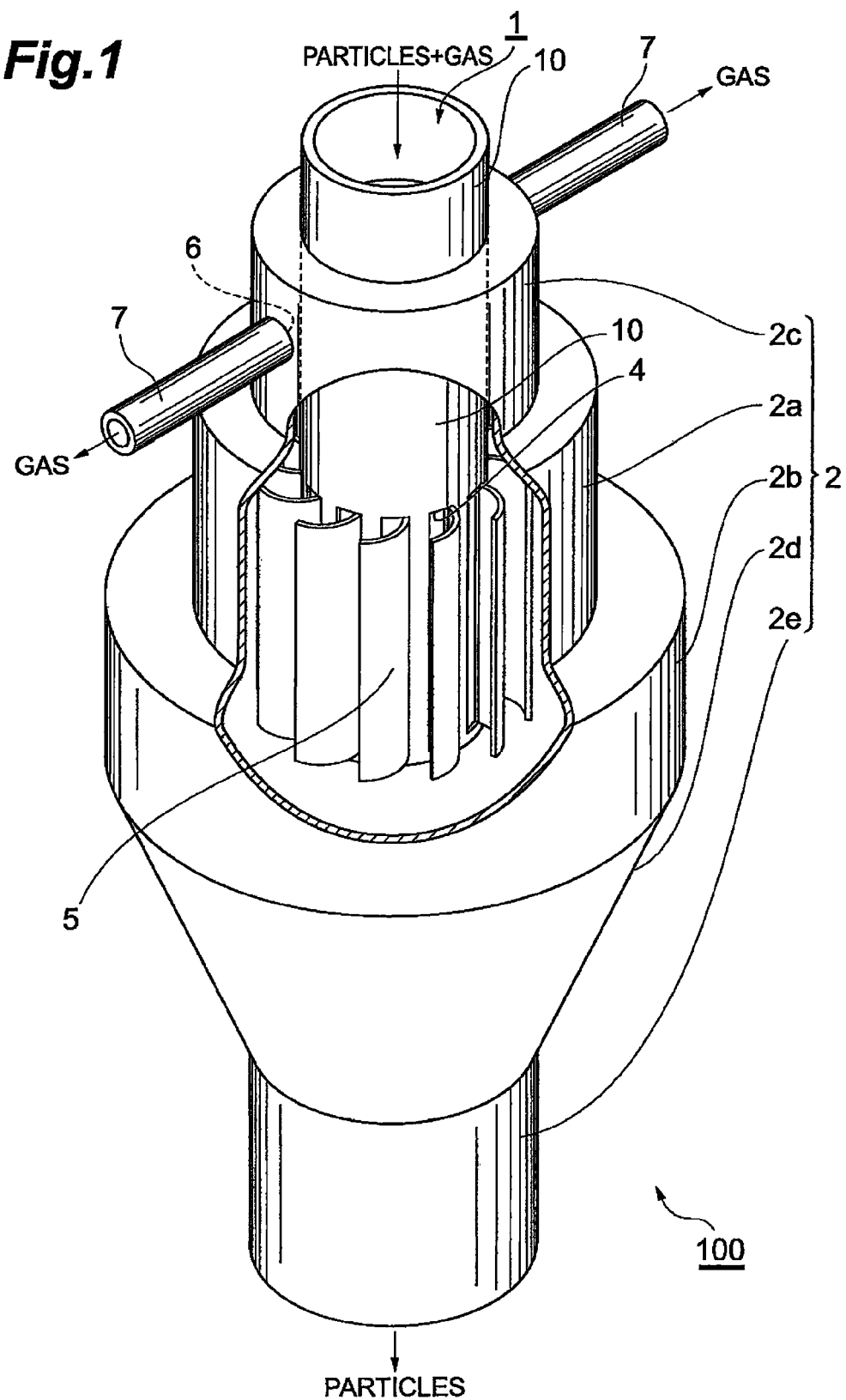
FIG. 1 is a partial broken perspective view of a gas-solid separator according to a first embodiment.

2 ... Outer cylinder
2a ... Upper outer cylinder
2b ... Lower outer cylinder
3 ... Particle vent port
4 ... Long hole
5 ... Guide blade
6 ... Gas vent port
10 ... Inner cylinder
100, 102 ... Gas-solid separator

BEST MODE FOR CARRYING OUT THE INVENTION

First Embodiment

The present invention is now described hereinafter in detail with reference to the drawings. FIGS. 1 to 4 show one aspect of a gas-solid separator according to the first embodiment, FIG. 1 showing a partial broken perspective view, FIG. 2 a longitudinal cross-sectional view of the gas-solid separator of FIG. 1, FIG. 3 a cross-sectional view taken along the plane III-III of the gas-solid separator, and FIG. 4 a perspective view showing a flow in the vicinity of guide blades.

A gas-solid separator 100, configured into a substantially cylindrical double structure with mainly an inner cylinder 10 mounted coaxially in a fixed condition and an outer cylinder 2 serving as an envelope, is used in a vertically extended position.

(Inner Cylinder)

The vertically extending inner cylinder 10 having a bottomed cylindrical shape has an inlet 1 formed at its opened upper end, and a mixture of particles and gas is fed from this inlet 1. A lower end of the inner cylinder 10 is sealed by a bottom plate 11.

On a side surface of the bottom plate 11 of the inner cylinder 10, a plurality of axially extending long holes (slits) 4 having a narrow rectangular shape (twelve of them in the diagram) are formed at circumferentially equally spaced parts.

The opening area of each long hole 4 is determined such that the linear velocity of the mixture passing through the long hole 4 becomes 1 to 40 m/s, preferably 3 to 25 m/s, or more preferably 3 to 15 m/s, depending on the amount of mixture supplied. Once the area of the long hole 4 is determined, the width W and the length L of the long hole 4 can be determined accordingly. The linear velocity of less than 1 m/s is not preferred because the linear velocity of the mixture passing through the long hole 4 slows down and gas-solid separation cannot be performed sufficiently. The linear velocity of more than 40 m/s is also not preferred because the long hole 4, guide blade 5 and side wall of the outer cylinder 2 become worn dramatically.

The practical width W of the long hole 4 in the horizontal direction is expressed in the following equations where L1 represents the circumferential length of the inner cylinder 10.

Width W of slit=1 mm to L¼, or preferably W=L$\frac{1}{16}$ to L$\frac{1}{64}$.

Moreover, the practical vertical length L of the long hole 4 is expressed in the following equation where La represents the height of an upper outer cylinder 2a and Lb the height of a lower outer cylinder 2b, the upper and lower outer cylinders being described hereinafter.

Length L of slit=(La+Lb)×a, where a is 0.1 to 0.99 or preferably 0.7 to 0.95.

Figure 3:
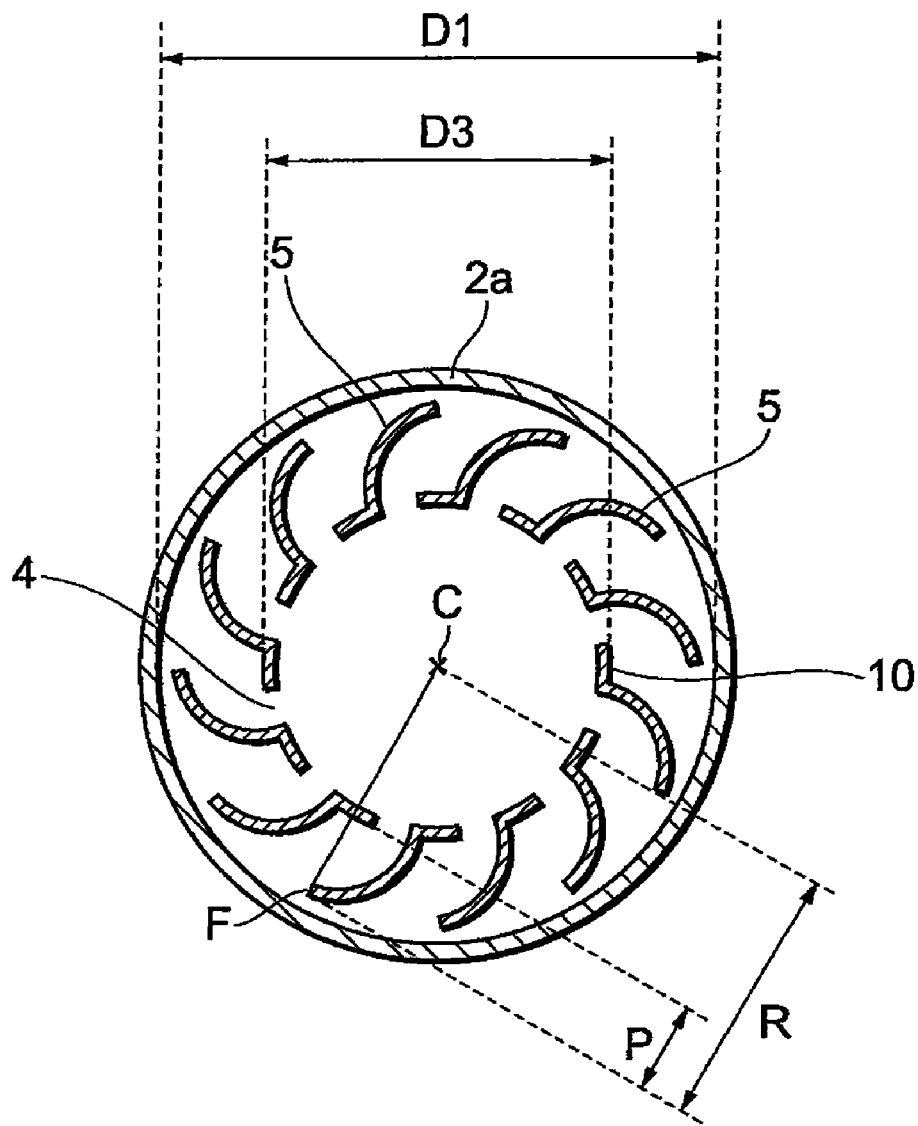
FIG. 3 is a cross-sectional view taken along the line III-III of FIG. 2.

One of long side edge parts of each of the long holes 4 is provided with the long curved-plate like guide blade 5 protruding outward. Specifically, the guide blades 5 are provided as many as the long holes 4 along the long side edge parts of the respective long holes 4. Each of these guide blades 5 forms a fixed angle with a radial direction of the inner cylinder. In other words, each of the guide blades 5 is provided at a tilt in a fixed circumferential direction, so as to cover each long hole 4. The inclination may be curved as shown in FIGS. 1 and 3, flat as shown in the cross-sectional view of (a) of FIG. 5, or partially bent plate-like as shown in (b) of FIG. 5. In the case of the bent inclination, the curved surface where the side facing the long hole 4 is concaved as shown in FIG. 3, particularly an arcuate cross-section, is preferred. When the inclination has the arcuate cross-section, the apex angle is preferably 70 to 120 degrees with radius r, and $0.4 \times (D2-D3) \leq r \leq 0.5 \times (D2-D3)$ is preferably established, where the outer diameter of the inner cylinder 10 is D3 and an inner diameter of the upper outer cylinder 2a is D2.

Radial direction protruding length P of each guide blade 5 (see FIG. 3), i.e. ((Distance R between the center C of the inner cylinder 10 and a leading end F of the guide blade 5)-0.5×Outer diameter D3 of the inner cylinder 10), is preferably set by the following equation, where the inner diameter of the upper outer cylinder 2a is D2.

It is preferred that all of the guide blades 5 be formed into the same shape and positioned at circumferentially equally spaced parts in order to obtain a smooth operation in the entire separator. Note that the guide blades 5 with a plurality of divided configurations may be provided to a single long hole 4.

Protruding length P of guide blade=(R-0.5×D3)=(D2-D3)×b, where b is 0.5 or lower, preferably 0.1 to 0.5, or more preferably 0.35 to 0.495.

When b is smaller than 0.2, that is, when the value of the radial direction protruding length P of each guide blade 5 is excessively small, the flow of gas ejected from the long holes 4 cannot be inverted accurately, and is therefore not preferred. When b is larger than 0.495, that is, when the value of the radial direction protruding length P of the guide blade is excessively large, the gap between the outer cylinder and the guide blade becomes excessively small, which might bring the guide blade into contact with the outer cylinder.

It is preferred that the vertical length of the guide blade 5 be approximately equal to the vertical length L of each long hole 4 and can be defined as follows.

Minimum height of guide blade 5=Length L of long hole 4/2

Maximum height of guide blade 5=Length of outer cylinder 2

Preferably, the vertical length of the guide blade 5 is at least the length L of long hole 4 or equal to 0.8×length of outer cylinder 2.

The number of long holes 4 is twelve in the illustrated examples but is not limited to this and thus may be two or more. It is preferred that the number of long holes 4 be eight to sixteen, or more preferably ten to fourteen. When there is only a single long hole 4 (less than two), inconvenience is caused because the gas flow inversion required for performing separation in the gap between the inner and outer cylinders cannot be achieved. In addition, although depending on the size of the inner cylinder 10, such as its diameter, even when more than sixteen long holes are provided, the separator generally becomes unnecessarily complicated and expensive. Therefore, no significant improvement in the separation efficiency is confirmed. The number of long holes 4 is obtained as a result of comprehensive judgment by analyzing an experimental result where the mixture is used in a fluid catalytic cracking unit for producing gasoline using heavy oil or the like as stock oil. The number of long holes in the present structure has a direct influence on a required separation efficiency and is preferably tested eventually through experiment in consideration of the opening area or the like.

For example, consider a case in which the linear velocity of the mixture passing through the inner cylinder is constant. In this case, i) when the number of long holes is the same, reducing the opening area of each long hole and increasing the linear velocity of the mixture passing through the long hole increase the change in velocity as a result of inverting the gas flow, thereby improving the separation efficiency. However, the adverse effect is that erosion accelerates. ii) When the linear velocity from the long holes is the same, reducing the opening area per long hole and increasing the number of long holes 4 allows to obtain stable velocity inversion throughout the entire separator, thereby improving the separation efficiency. However, the adverse effect is that the separator becomes complicated. In consideration of the above facts, the number of holes is determined eventually by an experimental result using the mixture by comprehensively determining the required separation efficiency, the degree of erosion, complexity of the separator, and the like.

With regard to the size of the inner cylinder 10, an outer diameter D3 thereof is preferably the same as that of an unshown mixture transfer tube connected directly to the upstream side. However, the size of the inner cylinder 10 may be reduced or increased in order to obtain appropriate linear velocity of the mixture passing through the inner cylinder 10. Specifically, it is preferred that the diameter of the inner cylinder be determined such that the mixture linear velocity of the inner cylinder 10 becomes 1 to 100 m/s, preferably 3 to 30 m/s, or more preferably 10 to 20 m/s.

(Outer Cylinder)

The outer cylinder 2 is a cylindrical body that covers the inner cylinder 10 from the outside and is positioned coaxially. The outer cylinder 2 is configured by, from top down, a gas guide cylinder 2c, the upper outer cylinder 2a, the lower outer cylinder 2b, a conical cylinder 2d, and a particle vent tube 2e. Particularly, the upper outer cylinder 2a and lower outer cylinder 2b are formed so as to surround a part 10a in which the plurality of long holes 4 of the inner cylinder 10 are formed. Specifically, the upper outer cylinder 2a is formed mainly for surrounding the upper part of the section 10a in which the long holes 4 are formed, while the lower outer cylinder 2b is disposed mainly for surrounding the lower part of the section 10a in which the long holes 4 are formed. It is preferred that the lower outer cylinder 2b further extend downward from the bottom plate 11 of the inner cylinder 10.

In the present embodiment, particularly, the inner diameter D1 of the lower outer cylinder 2b is larger than the inner diameter D2 of the upper outer cylinder 2a. Particularly, it is preferred that $1.01 \leq (D1/D2) \leq 1.3$ be satisfied. Also, the inner diameter D2 of the upper outer cylinder 2a preferably satisfies 1.1×D3 to 20×D3, where D3 represents the outer diameter of the inner cylinder 10. Specifically, D2 is preferably 1.1×D3 to 3×D3. Considering reducing the residence time, it is preferred that D2 be reduced as much as possible on the basis of the radial direction protruding length P of each guide blade 5. It is also preferred that (La+Lb) be 0.8 to 10 times the inner diameter D3 of the inner cylinder 10, where La represents the height of the upper outer cylinder 2a and Lb the length of the lower outer cylinder 2b. Considering reducing the residence time, it is preferred that (La+Lb) be reduced on the basis of the vertical length of each long hole 4. Specifically, (La+Lb) is preferably 1 to 5 times as large as D3.

In addition, it is preferred that Lb/(La+Lb) be 0.05 to 0.6. Although at least a part of the lower outer cylinder 2b needs to surround the lower part of the long holes 4, it is preferred that the lower outer cylinder 2b surround 5 to 50% of the vertical length L of the long holes 4 from the bottom. Here, the height of the section of the lower outer cylinder 2b that faces the long holes 4 of the inner cylinder 10 is referred to as pocket height LC.

Figure 6:
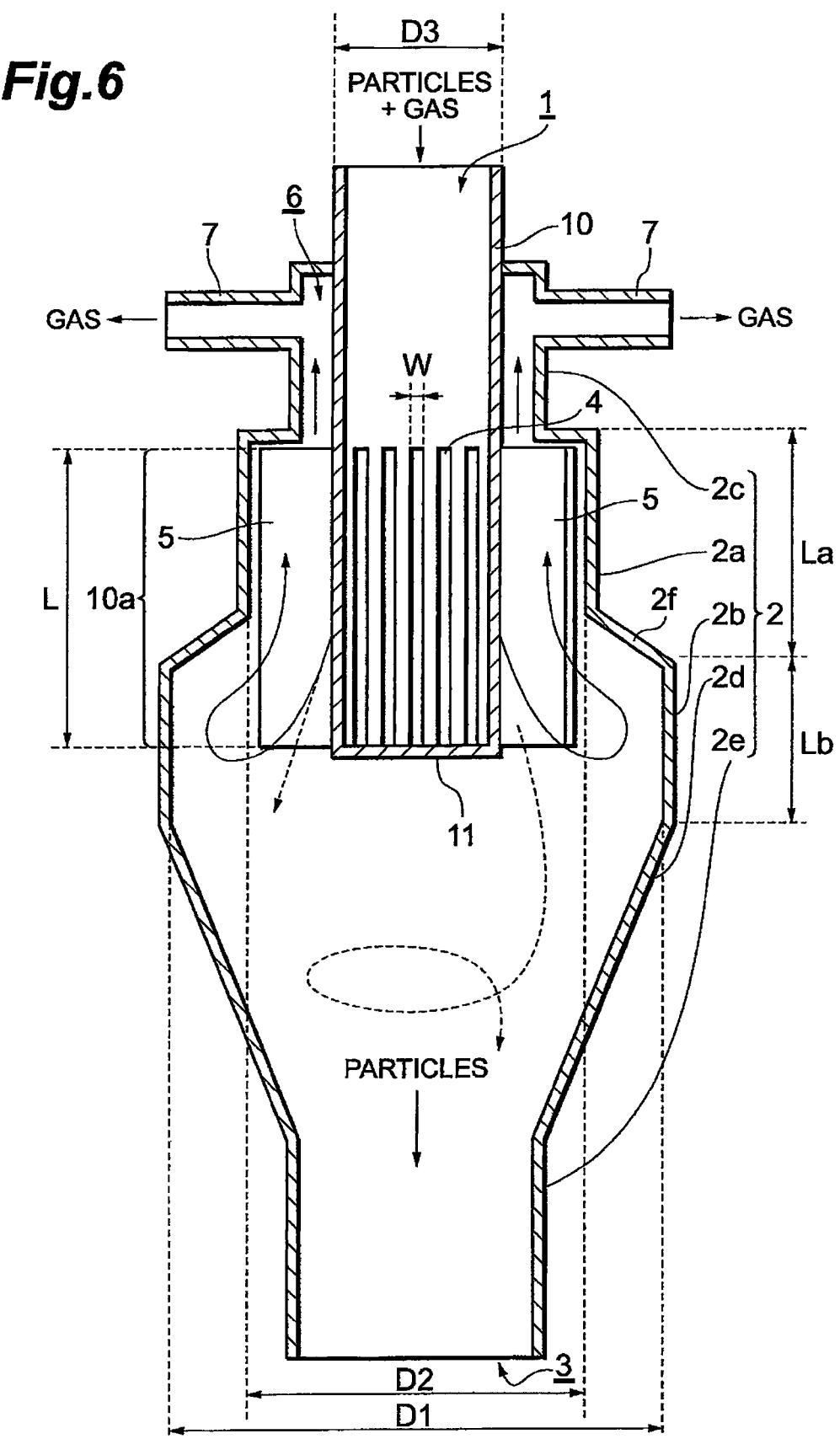
FIG. 6 is a longitudinal cross-sectional view showing a first modification of the gas-solid separator shown in FIG. 2.
Figure 7:
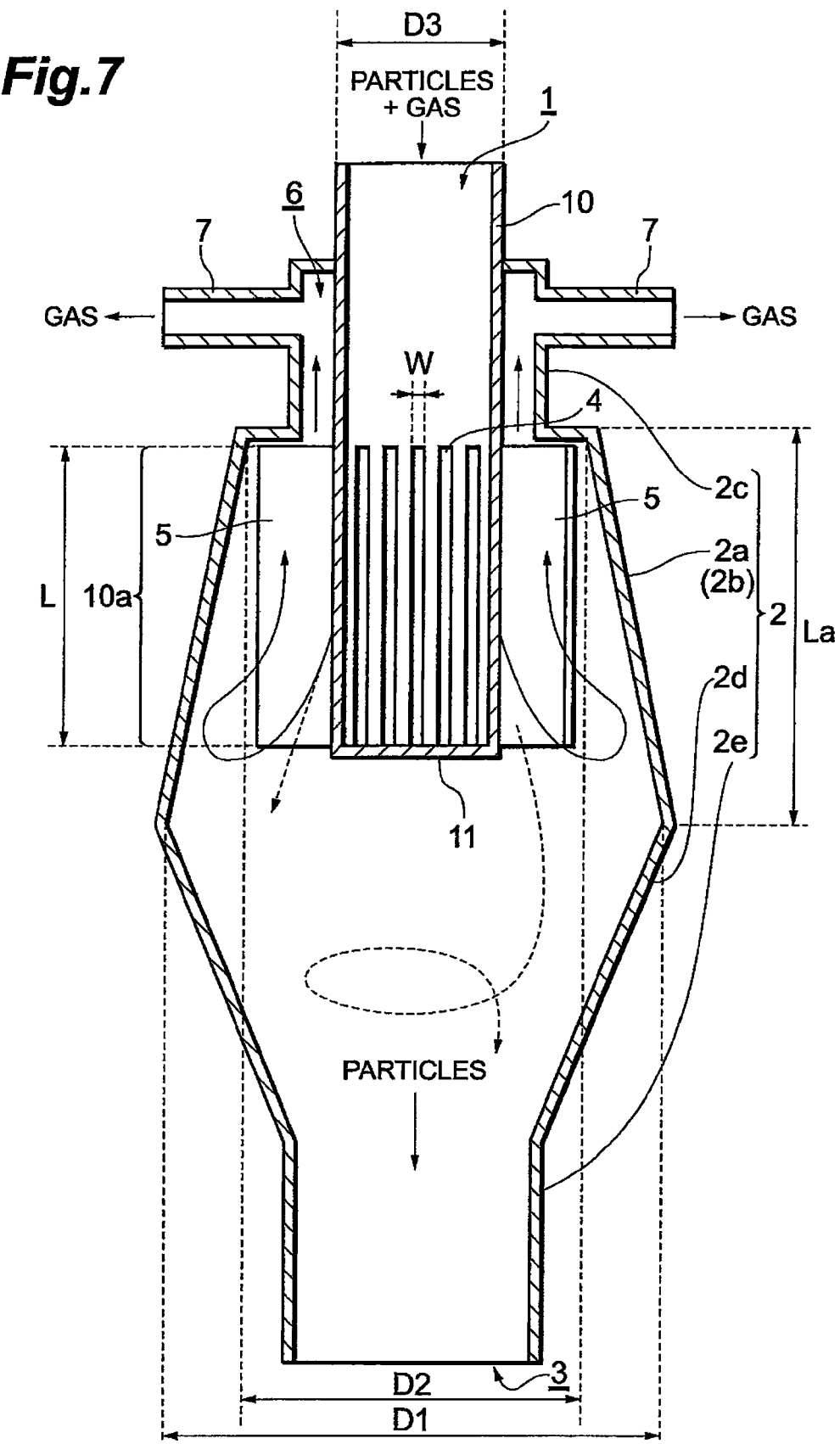
FIG. 7 is a longitudinal cross-sectional view showing a second modification of the gas-solid separator shown in FIG. 2.

Note in the present embodiment that the upper outer cylinder 2a and the lower outer cylinder 2b are each configured a cylinder having a fixed inner diameter and that the upper outer cylinder 2a and the lower outer cylinder 2b are connected by a circular ring 2f in which an inner edge and outer edge are disposed on the same plane, so that the inner diameter of each cylinder drastically changes in the vertical direction. However, the upper outer cylinder 2a and the lower outer cylinder 2b may be connected by a tapered circular ring 2f, as shown in FIG. 6. Furthermore, the upper outer cylinder 2a and the lower outer cylinder 2b may be tapered such that the inner diameters thereof increase downward as shown in FIG. 7. The important thing is that the diameter D1 of the lower is larger than the diameter D2 of the upper in the section of the outer cylinder 2 that surround the plurality of long holes 4.

On the upper outer cylinder 2a is disposed the cylindrical gas guide cylinder 2c having a smaller diameter than the upper outer cylinder 2a, and a gas vent port 6 is formed at two opposing positions on a side surface of the gas guide cylinder 2c. Gas vent tubes 7 communicated with the outside and extending in the radial direction are connected with the gas vent ports 6, respectively. The gas vent tubes 7 may be inclined upward or downward.

On the other hand, the conical cylinder 2d tapering downward and the small diameter particle vent tube 2e are connected in this order with a lower end of the lower outer cylinder 2b. The particles are discharged from a particle vent port 3 provided at a lower end of the particle vent tube 2e. The gas is not constantly discharged from the particle vent port 3 of the particle vent tube 2e but is discharged constantly only through the gas vent tubes 7. The outer cylinder 2 and the inner cylinder 10 are communicated with each other via the long holes 4 only. The opening size of the particle vent port 3 of the particle vent tube 2e is preferably 0.8 to 2 times the outer diameter D3 of the inner cylinder 10.

Each of the above components is formed from an appropriate material that withstands chemical reactions. For example, stainless steel is an appropriate material as it is excellent in workability and has good chemical resistance. Moreover, different materials may be combined appropriately to configure each component. The important thing is that it is only necessary to use a material having necessary rigidity and resistance characteristics.

Next, the operations of the present embodiment are described. The mixture of gas and solid particles is fed from a mixture feed port 1 provided in the upper part of the gas-solid separator, downward to the inner cylinder 10 at a predetermined velocity. Although not particularly limited, examples of the solid particles include a fluid contact catalyst (FCC) that has an average particle diameter of approximately 1 to 500 μm and a particle bulk density of 0.6 to 0.9 g/cm³.

The lower end part of the inner cylinder 10 is sealed by the bottom plate 11, with which some of the solid particles directly collide only immediately after starting to feed. Consequently, a solid particle bed (catalyst bed) is gradually formed and thereby the bottom plate is protected from collision/impact of the solid particles.

Figure 2:
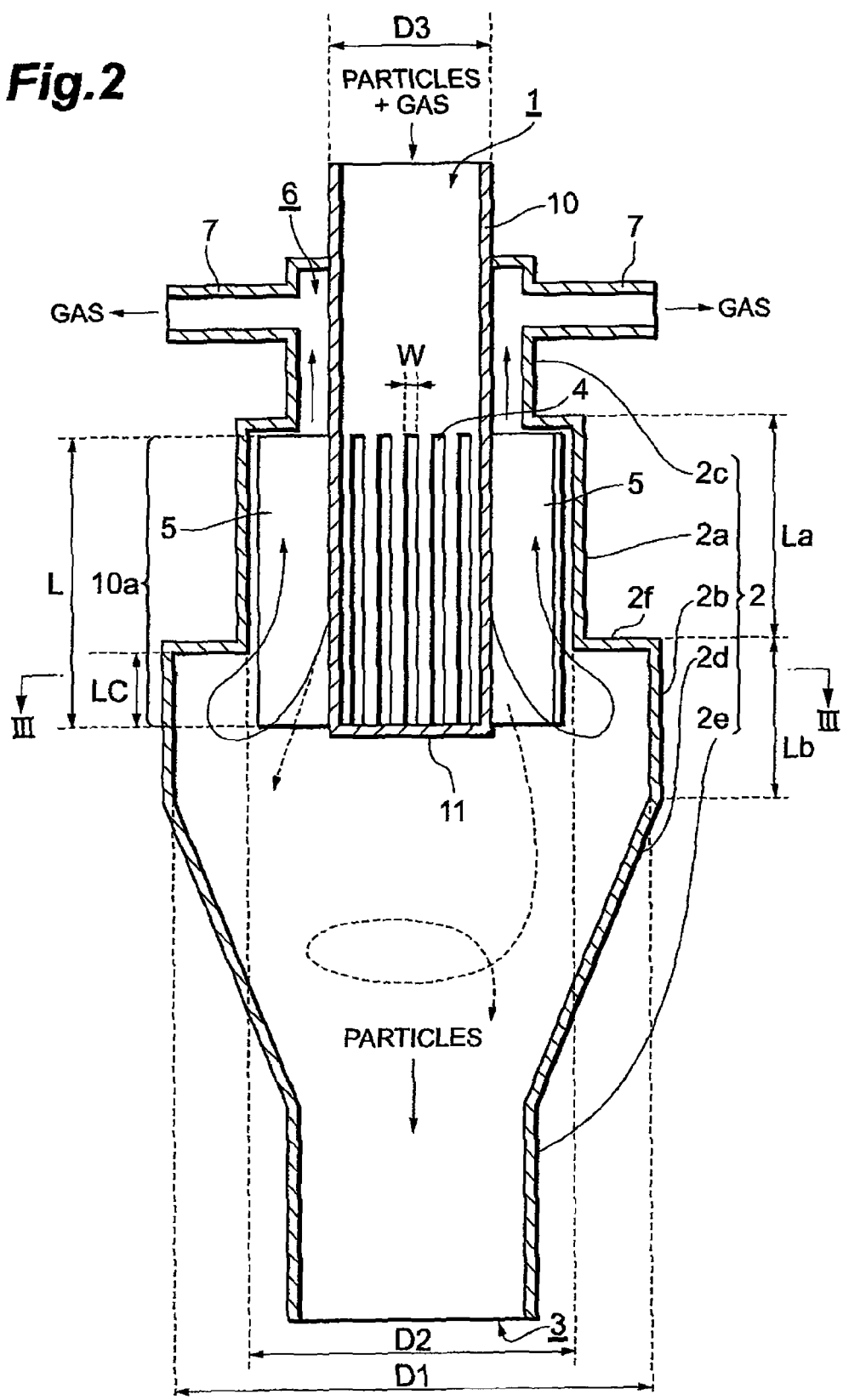
FIG. 2 is a longitudinal sectional view of the gas-solid separator shown in FIG. 1.
Figure 4:
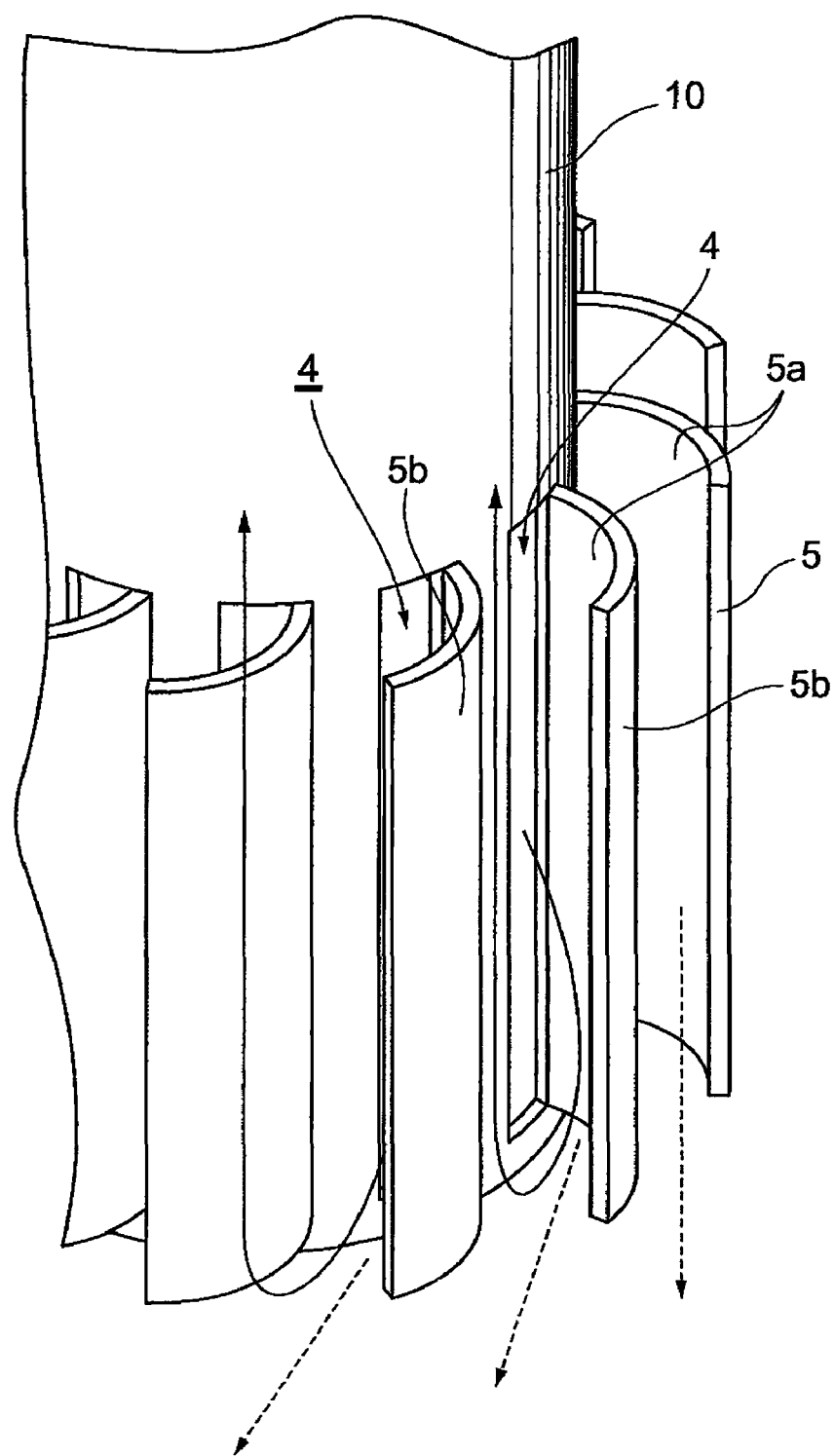
FIG. 4 is an enlarged perspective view showing the vicinity of guide blades shown in FIG. 1.

The mixture that constantly flows from the top to the bottom of the diagrams is interrupted through the bottom plate and the particle bed, which gives a lateral (horizontal direction) velocity to the flow of the mixture. The mixture then spurts out laterally downward from the plurality of holes (slits:4) provided on the side surface of the inner cylinder 10, as shown in FIGS. 2 and 4. Here, the solid arrows show the flow of the gas, and the dashed arrows the flow of the solid particles.

Thereafter, as shown in FIG. 4, the gas flows downward out of the long holes 4, is guided to inner surfaces 5a by the guide blades 5 and slightly swirled clockwise as viewed from the top of the vertical axis in the diagram. Thereafter, the gas rises clockwise along an outer surface 5b of an adjacent guide blade 5 and is thereafter discharged from the gas vent ports 6.

Some of the solid particles, on the other hand, collide with the inner surfaces 5a of the guide blades 5 and directly move downward along the inner surfaces. Most of the rest of the particles leave the flow of the gas and directly proceed downward because the velocity of these particles is not inverted along with the gas due to their inertia or deadweight when the flow of the gas is inverted from the downward direction to the upward direction. Then, these particles are swirled along the inner surface of the conical cylinder 2d and discharged from the particle vent port 3, as shown in FIG. 2.

In this manner, the mixture of gas and solid particles is separated into gas and solid particles.

In addition, according to the invention of the present application, particularly the inner diameter D1 of the lower outer cylinder 2b is larger than the inner diameter D2 of the upper outer cylinder 2a. Because the gap between the inner cylinder 10 and the outer cylinder 2 is increased in a section where the velocity of the gas is inverted from downward to upward, the ascent velocity of the gas in the inverted section is reduced. Therefore, the number of solid particles flowing with the rising gas can be reduced easily, so that the separation efficiency can be improved.

Note that the additional factors affecting the separation efficiency include the particle diameter, the particle density, and the density difference between the gas and particles. The greater these factors are, the higher the separation efficiency becomes.

Second Embodiment

Next, the second embodiment is descried with reference to FIG. 8. When using the present gas-solid separator in the fluid catalytic cracking unit that produces gasoline using heavy oil as stock oil, the catalyst discharged from the particle vent port 3 has gas between the particles, and the heavy oil is adhered to the particles. Therefore, the catalyst is normally supplied from the particle vent port 3 to an unshown stripping device and then removed by inert gas, such as steam.

Sometimes the stripping device becomes the problem when it comes to a short contact time reaction. In other words, because the residence time during which the catalyst remains in the stripping device is generally long, the reaction is continued until stripping is completed. Therefore, it is preferred to install a pre-stripping device (with small capacity) of the lower residence time in order to prevent such an unnecessary reaction and to eliminate the impact of an undesirable phenomenon where some of the gas is fed from a particle vent port into the stripping device.

The gas-solid separator of the present embodiment is different from that of the first embodiment in that a pre-stripping mechanism 13 is incorporated in the lower part of the gas-solid separator so that pre-stripping can be performed in the lower part of the outer cylinder 2.

Specifically, a lower part of the lower outer cylinder 2b is further provided with an outer cylinder 2g, and a plurality of stages of baffles 14 are provided on the inner surface. Moreover, an inner cylinder 10g extends below the bottom plate 11 of the inner cylinder 10, and the plurality of stages of the baffles 14 are provided to a circumferential surface of the inner cylinder 10g as well. In addition, annular steam supply means 12 is provided within the outer cylinder 2g and a lower part of the inner cylinder 10g. The particle vent port 3 is connected below the pre-stripping device 13 of the outer cylinder 2g. The solid particles extracted from the particle vent port 3 are fed into a stripping device that is not shown.

In this gas-solid separator, the solid particles that are separated in an upper part of the outer cylinder 2 are dropped while being dispersed by the baffles 14 and then subjected to pre-stripping by the steam supplied from the steam supply means 12. Gas, oil vapor, stripping steam or the like generated from the pre-stripping device 13 is not discharged from the pre-stripping device to the outside the system but is directly fed into the gas-solid separator. In this manner, the pre-stripping effect can be improved and power-saving of the equipment can be achieved. Note that a decrease in the separation efficiency is hardly confirmed even when the pre-stripping mechanism is fed.

Note that the present embodiment uses the type of pre-stripping mechanism (device) that disperses the solid particles using the baffles 14 provided on the surfaces of the outer cylinder 2g and of the inner cylinder 10, but not only this mechanism but also a mechanism equivalent to a type of pre-stripping device that uses a perforated tray (perforated board) or a dense fluidized bed can be adopted.

EXAMPLES

Examples 1 to 6

The gas-solid separator shown in FIGS. 1 to 4 having the following conditions was used to experiment separation of air of a temperature of 20° C. which contains solid particles having an average particle diameter of 60 μm and a particle bulk density of 0.7 g/cm³. The size and conditions of the gas-solid separator are shown in FIG. 9. The number of long holes (guide blades) is twelve. Catalyst correction efficiency (unit: %)=(Weight of solid substance extracted from solid-substance vent port)/(Weight of catalyst supplied to separator).

Comparative Example 1

Same as Example 1 except that the inner diameter D1 of the lower outer cylinder 2b was made equal to the inner diameter D2 of the upper outer cylinder 2a.

Examples 7 to 11

Same as Example 1 except that the radial direction protruding length P of each guide blade was changed as shown in FIG. 10.

Examples 12 to 16

Same as Example 1 except that the pocket height was changed.

The invention claimed is:
1. A gas-solid separator, comprising:
an inner cylinder having a closed lower end and an opened upper end, and extending in a vertical direction; and
an outer cylinder that coaxially covers the inner cylinder from the outside and has a gas vent port formed on the upper end side and communicating with an exterior,
wherein a plurality of axially extending long holes are formed on a side surface on the lower end side of the inner cylinder in a circumferential direction,
one of long side edge parts of each of the long holes is provided with a guide blade that protrudes outward and is inclined circumferentially so as to cover the long hole, and
in a section of the outer cylinder that surrounds the plurality of long holes of the inner cylinder, an inner diameter D1 of a lower part of the outer cylinder is larger than an inner diameter D2 of an upper part of the outer cylinder, and an outer diameter D3 of a part forming the plurality of long holes in the inner cylinder is constant.
2. The gas-solid separator according to claim 1, wherein $1.01 \leq (D1/D2) \leq 1.3$ is satisfied.
3. The gas-solid separator according to claim 1, wherein a radial direction protruding length P of each guide blade satisfies $(D2-D3) \times 0.1 \leq P \leq (D2-D3) \times 0.5$, where D3 represents an outer diameter of the inner cylinder.
4. The gas-solid separator according to claim 1, wherein the outer cylinder is formed by vertically connecting an upper outer cylinder having the inner diameter D2 with a lower outer cylinder having the inner diameter D1, and the lower outer cylinder surrounds 5 to 50% of a vertical length L of each long hole from the bottom.
5. The gas-solid separator according to claim 1, wherein $1.01 \leq (D1/D2) \leq 1.5$ is satisfied.

* * * * *